Aug. 17, 1937.   JEAN-BAPTISTE BOISVERT   2,090,324
ROAD GRADER ATTACHMENT
Filed Feb. 27, 1936
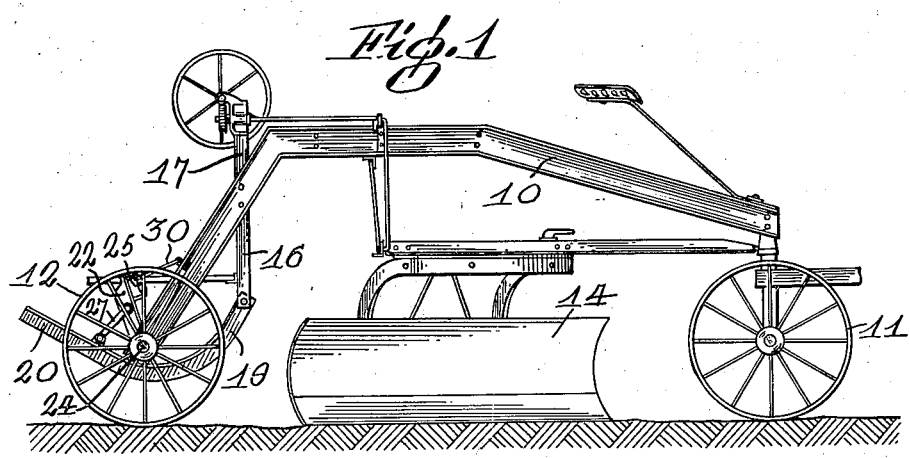
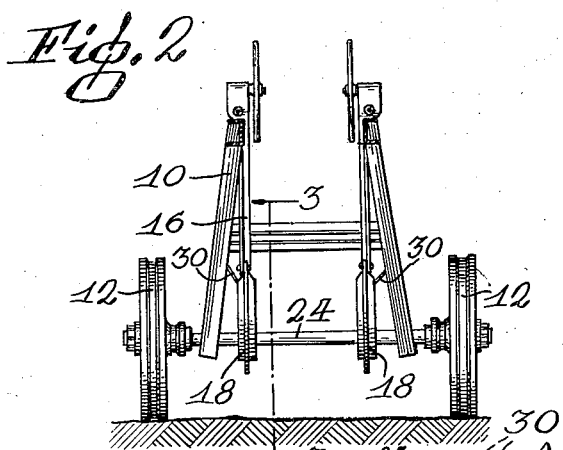
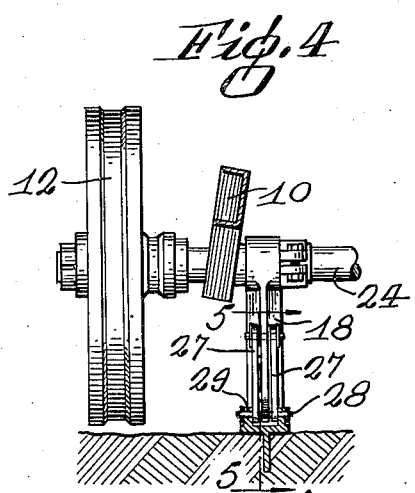
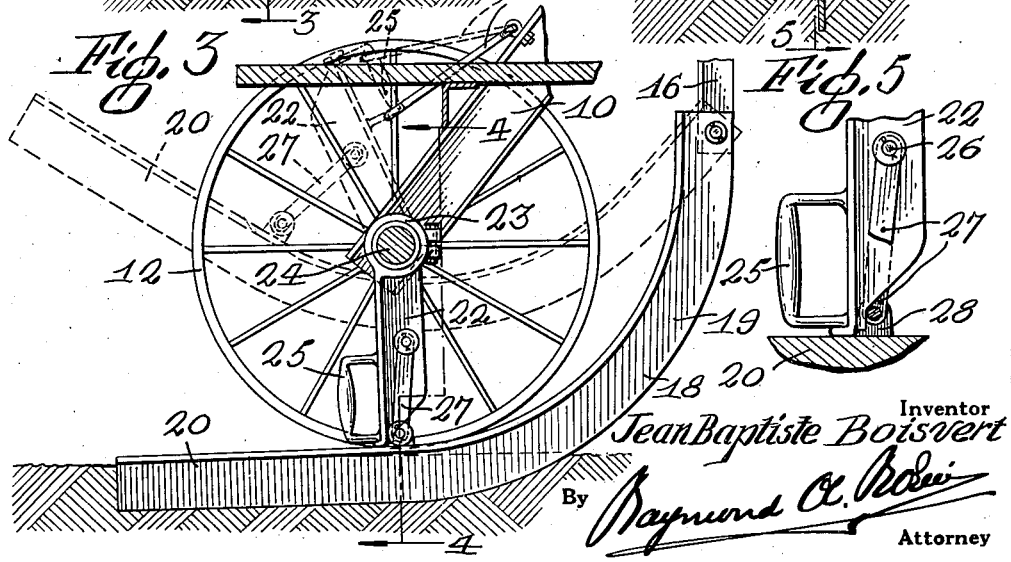
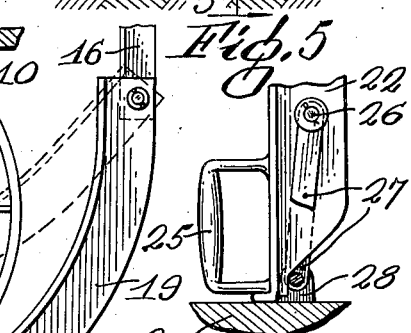
Inventor
Jean Baptiste Boisvert
By
Attorney Patented Aug. 17, 1937

2,090,324

UNITED STATES PATENT OFFICE 2,090,324

ROAD GRADER ATTACHMENT

Jean-Baptiste Boisvert, Plessisville, Quebec, Canada, assignor to The Plessisville Foundry, Plessisville, Quebec, Canada Application February 27, 1936, Serial No. 66,089

2 Claims. (Cl. 37—150)

The present invention relates to attachments for grading machines, and particularly for machines employed for scraping and levelling roads, farm land and the like.

An object of the invention is the provision of a road grader equipped with a device capable of movement to an operative position engaging the surface upon which the grader is moving with a view to preventing side slip of the machine.

A further object of the invention is the provision of a machine of the above character having a side slip preventing device which may be easily and quickly moved to an operative ground engaging position or to an out of the way inoperative position.

Another object of the invention is the provision of a grader of the aforesaid character having means whereby the side slip preventing attachment may be firmly locked in operative ground engaging position.

A still further object of the invention is the provision of a side slip preventing attachment of the aforesaid character which is relatively simple in construction and effective for the purpose intended.

Other objects and advantages of the invention will become apparent as the description progresses.

In the accompanying drawing forming a part of this specification and in which like reference characters are employed to designate corresponding parts throughout the same:

Figure 1 is a side elevational view of the grading machine equipped with the improved attachment, Figure 2 is a rear elevational view of the same, Figure 3 is an enlarged vertical section on line 3—3 of Figure 2, Figure 4 is a section on line 4—4 of Figure 3, and Figure 5 is an enlarged section on line 5—5 of Figure 4.

Referring to the drawing, wherein for the purpose of illustration is shown a preferred embodiment of the invention, 10 generally designates the frame of a conventional road grading machine of the type commonly used for scraping and levelling roads, farm lands and the like and for snow clearing purposes. The frame 10 is mounted on front and rear carrier wheels 11 and 12 respectively and supports an obliquely disposed scraper blade 14 supported to enable selective vertical adjustment.

The present invention relates to a device to be attached to the rear of the grader for the purpose of preventing or greatly reducing side slip of the machine when it is operated upon soft or yielding ground, as for instance upon mud or snow. The attachment embodies a pair of parallel vertically disposed support bars 16 rigidly attached to the intermediate portion of the main frame 10 and which may form a downward continuation of a pair of bracket supporting bars 17 employed to support the bearing brackets for gearing designed to control vertical adjustment of the scraper 14. To the lower extremity of each of the two support bars 16 is pivotally connected a runner-like member 18 preferably formed from T-bar material curved to form an arcuate upturned forward portion 19 and a straight rear portion 20. Each of the runner members 18 is disposed so that the wider stem portion is disposed transversely, while the flange portion is arranged vertically so that the flange may be pressed into and will cut through the ground.

The runners 18 are moved vertically through the medium of mechanism embodying a lever 22, preferably T-shaped in cross section, having the inner end formed with an eye 23 for swinging connection with the rear axle 24 of the machine. To the outer stem portion of the lever 24 is connected an actuating handle 25. To a pivot pin 26 extending through the intermediate portion of the flange of the lever are connected the inner extremities of a pair of link bars 27 disposed one on each side of the flange and having their opposed outer extremities connected to a pivot pin 28 mounted in lugs 29 formed on the intermediate portion of the runner.

To the rear side portions of the frame 10 are pivotally connected a pair of hooks 30 adapted to engage the handles 25 of the levers 22 when the levers are elevated.

When the machine is being operated on firm ground each of the levers 22 is swung to an elevated approximately upstanding position and the runners 18 connected therewith assume raised positions, as shown at Figures 1 and 2. The hooks 30 engage the handles 25 to securely retain the runners in elevated inoperative positions. When, on the other hand, the machine is operated on soft ground or on snow, the hooks are disengaged from the handles so that the runners, together with the pivoted joints connected therewith, may be dropped. As the runner members are lowered, the handles 25 are grasped and the levers 22 forced forwardly producing a toggle action on the connecting joint in which the centre pivot 26 is moved past the centre line to lock the joint until it is desired to release the same. When the joint is thus disposed in locked position, the bottom free end of the lever 22 contacts with the runner member to provide a firmly braced support. This forms a firm readily releasable runner support structure which will force the flange or rib into the soft ground and provide an effective device for preventing or greatly reducing side slip of the machine. As will be readily apparent, the runner bars may be readily moved into selected positions, in accordance with operating conditions.

It is to be understood that the form of my invention herein shown and described is to be taken as a preferred example of the same and that various changes as to the shape, size and arrangement of parts may be resorted to without departing from the spirit of the invention or the scope of the subjoined claims.

Having thus described my invention, I claim:—

1. In a machine of the character described, a wheeled frame, a pair of ground engaging members pivotally mounted on the frame in longitudinally extending positions, the said members being disposed to be pressed into and cut through the ground to prevent side slip when in operative positions, a pair of vertically swinging levers attached to the frame, links connecting each of said levers with the respective ground engaging members to form a knee joint whereby the members may be swung to ground engaging operative positions or elevated inoperative positions, and means for releasably holding the said joints and ground members in raised positions.

2. In a machine of the character described, a frame having front and rear axles, wheels journalled to said axles, a pair of ground engaging members pivoted adjacent the rear axle and adapted to be pressed into and to raise the rear wheels from the ground to prevent side slip, and a toggle joint connected with each of said members for operatively swinging the same into locked ground engaging position or releasably retracted elevated inoperative position.

JEAN-BAPTISTE BOISVERT.